Jan. 12, 1926.

F. J. SÉVIGNÉ

1,569,208

FRUIT MARKING MACHINE

Filed August 5, 1925

INVENTOR_
FREDERICK J. SÉVIGNÉ.
BY
ATTORNEY

Jan. 12, 1926.  
F. J. SÉVIGNÉ  
1,569,208  
FRUIT MARKING MACHINE  
Filed August 5, 1925 2 Sheets-Sheet 2
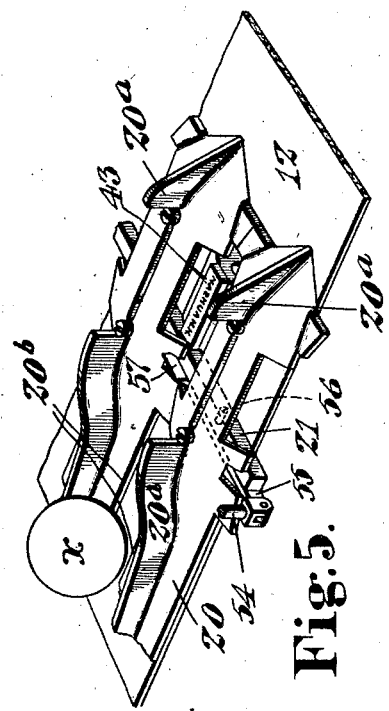
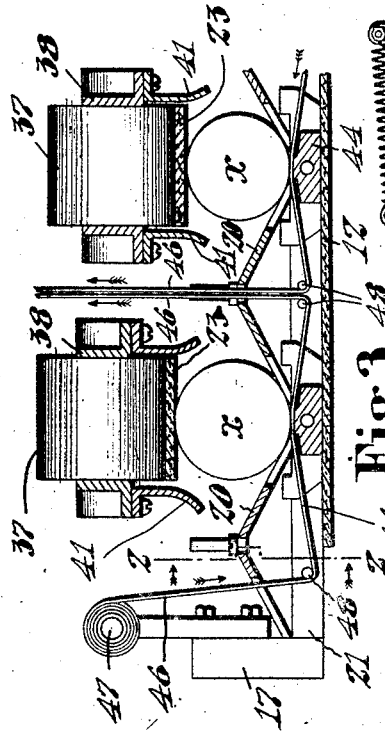
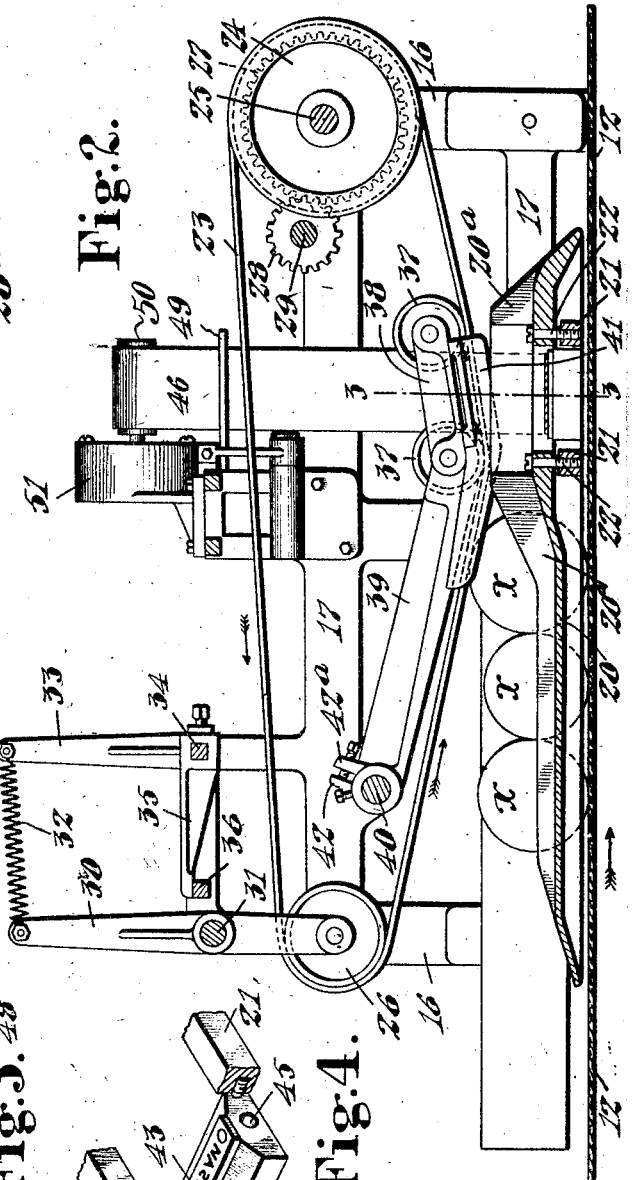
INVENTOR.  
FREDERICK J. SÉVIGNÉ.  
BY  
*A. W. Harrison*  
ATTORNEY.

Patented Jan. 12, 1926.

1,569,208

UNITED STATES PATENT OFFICE.

FREDERICK J. SÉVIGNÉ, OF MILFORD, NEW HAMPSHIRE.

FRUIT-MARKING MACHINE.

Application filed August 5, 1925. Serial No. 48,264.

*To all whom it may concern:*

Be it known that I, FREDERICK J. SÉVIGNÉ, a citizen of the United States, and resident of Milford, in the county of Hillsborough and State of New Hampshire, have invented certain new and useful Improvements in Fruit-Marking Machines, of which the following is a specification.

This invention relates to the treatment of fruit, especially citrus fruit such as oranges and grape fruit, so as to mark their surfaces with identifying trade-marks, names or words. To facilitate an understanding of and the reasons for the present invention, the customary practice will first be explained.

A fruit packing house equipment usually has one or more units, each unit including a washer to which the fruit is delivered from the pickers' boxes, a dryer, a polisher, a grader, and a sizer through which the fruit (which for the sake of brevity and not of limitation will be hereinafter referred to as oranges) continuously passes in the successive order named.

The utility of the sizer is explained in Letters Patent No. 1,537,603, granted May 12, 1925, on an application by A. B. Hale. The present invention is designed particularly for marking fruit delivered to it by the sizer belt, although I do not limit myself to the use of the machine in that particular location, as the carrier may be any one of the various belts employed in citrus fruit packing houses for effecting transportation of the fruit from one place or apparatus to another. My improved marking machine is designed to be supported in such close proximity to the upper surface of a carrier belt that said belt not only delivers the fruit to the marker but also from it.

Most fruit marking machines are so constructed and located that the fruit must roll by gravity toward position to be engaged by something else to ensure contact of the fruit with the marker, with the result that the action is not always reliable. An important feature of the present invention is that the fruit is positively advanced, whether in close relationship or scattered, to a point where a friction feeder ensures movement of the fruit past the marker.

Another important feature of the invention is that although heat is employed to aid in transferring coloring matter from a ribbon to the fruit, it is employed at such a low degree that at no time is there any melting of any natural wax of the fruit.

The invention consists in the apparatus and in the construction and combination of parts, substantially as hereinafter described and claimed.

Of the accompanying drawings:—

Figure 2 represents a longitudinal section of the machine and a portion of the carrier belt.

Figure 3 represents a transverse section of about one-half of the machine.

Figure 4 is a perspective view of the die and illustrates how the die is supported, the machine illustrated, however, employing four of such dies.

Figure 5 is a perspective view of portions of two of the fruit guiding members, and the position of one of the dies relatively thereto.

Similar reference characters indicate similar parts in all of the views.

Figure 1:
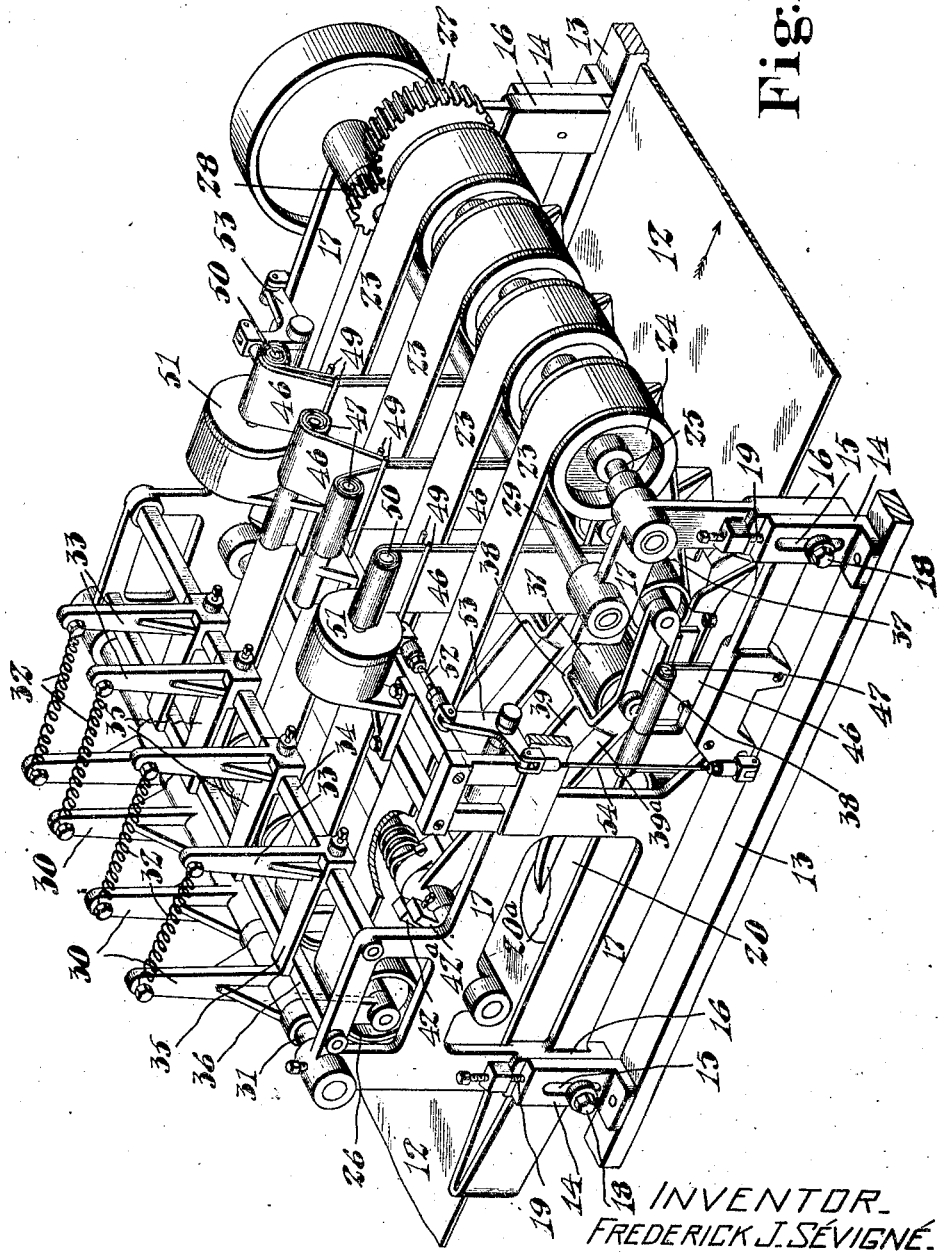
Figure 1 is a perspective view of the machine in its relation to a carrier belt, a portion of the frame of the machine being broken away.

In the drawings a portion of the carrier belt is illustrated at 12. Said belt, in operation, is driven in the direction of the arrows by any suitable mechanism not necessary to illustrate.

The rails 13 are those which, as is customary in packing house units, extend along the sides of the carrier belt. The frame of the machine is mounted on the rails 13 so that it can be readily placed and secured anywhere longitudinally thereof. To this end, the frame of the machine includes four uprights 14, slotted at 15, and mounted on the two rails 13 and secured in the desired position by suitable screws or otherwise. Vertical members or legs 16 of the framework 17 are secured to said uprights 14 by bolts 18 passing through said legs and the slots 15. This is to enable the machine to be very accurately adjusted vertically to enable the fruit to be taken directly from the carrier belt 12 by the friction feeder hereinafter described. To aid in effecting and maintaining such accurate adjustment, screws 19 are fitted to lugs of the legs 16 and bear on the tops of the uprights 14.

Supported close to the carrier belt 12 are guides 20 having strengthening ribs 20$^a$ cut away near their delivery ends (Fig. 5), the adjacent side edges of said guides, along their receiving portions, being so spaced that the oranges will be supported by the carrier belt and advanced by it until they arrive under the friction feeding belts 23 as presently described. In the illustrated structure of the machine there are five guides providing spaces for four rows of oranges, there are four of the friction belts 23.

The guides are supported by cross bars 21 of the frame (Fig. 2) and are removably secured thereto as by screws 22.

As best illustrated by Figure 5, the adjacent side edges of the guides are recessed to provide spaces for the marking dies presently described, the fruit being successively rolled up slight inclined portions of the guides and over the dies by belts 23 mounted at one end on pulleys 24 carried by a shaft 25 and at the other end on yielding idler pulleys 26. The shaft 25 carries a gear 27 in mesh with a pinion 28 carried by a shaft 29 which is driven by a suitable motor at such speed that the belts 23 travel faster than the carrier belt 12.

Each pulley 26 is carried by the lower end of an upright lever 30 pivotally mounted on a cross bar or rod 31, and the upper end of each lever is connected by a spring 32 with an upright arm or stud 33 adjustably mounted on a cross bar 34 and having a lateral foot piece 35 bearing on a cross bar 36.

The belts 23 are driven in the direction of the arrows (Fig. 2), and the lower or operative run of each belt is independently deflected downward by a pair of rolls 37 mounted in a yoke 38 at the end of an arm 39 pivotally mounted on a cross rod 40. Each arm 39 has a wide flat under face 39ª to guide the operative run of the belt below it and render it certain that said portion of the belt will run in a straight direction, or not be flexed upwardly, when an orange is being taken from the carrier belt and fed up the slight incline of the guides to and over the marker.

Each yoke 38 has side plates 41 extending down from it to guide the fruit x laterally (Fig. 3).

Each arm 39 has a lug 42 (Figs. 1 and 2) which contacts with the end of a screw adjustable in a fixed lug 42ª to thereby limit or stop downward movement of the arm and its yoke and rolls and avoid any liability of the belt 23 being depressed into contact with any portion of the guides or the ribbon or die presently described.

Each die 43 is removably secured to the top of a metal block 44 (Fig. 4) which is supported by the cross bars 21, and has a recess 45 to contain a suitable electric heating element when it is desired that a heated die shall be employed to facilitate the marking.

A ribbon 46 carrying suitable ink or coloring matter is fed step by step over each die. In the particular embodiment of the invention illustrated, which employs four guideways, four belts 23 and four dies, all above and close to one carrier belt 12, I provide four spools of ribbon 46 supported by four pins 47 two of them projecting from brackets carried by cross bars at the top of the frame (Fig. 1). A third one of the pins 47 is near the lower portion of one of the side frame members, and the fourth is in a corresponding location at the other side of the frame and consequently not appearing in Figure 1.

The ribbons are guided by pins 48 (Fig. 3) under the guides 20 and over the dies, suitable upper guiding pins 49 being also employed as shown by Figure 1. The four ribbons are wound up on two spindles 50, two of the ribbons passing to each spindle (Fig. 1). In other words, the two ribbons at one side of the machine are wound together on one spindle 50, and the two ribbons at the other side are wound together on the other spindle 50. This is best illustrated by the fragmentary view, Figure 3, arrows indicating the direction of feed or travel of one pair of ribbons.

The winding spindles 50 are actuated step by step, by mechanisms which may be of any well known or preferred type and consequently not necessary to illustrate as to details, said mechanisms being contained in the two casings 51 (Fig. 1) and permitted or caused to operate by ordinary pawl and ratchet mechanisms or devices. The mechanism in each casing 51 is controlled by a rod 52 connected to one arm of an elbow lever 53 the other arm of which is connected by a rod 54 with a lever 55 (Fig. 5) pivoted at 56 to a cross bar 21 and having a bevelled trip end 57 in the path of the fruit on the way to the die. This mechanism provides for the feed of the ribbon only when a fruit is being fed to position to be marked.

In operation, when it is desired to employ heated dies, the degree of heat is so controlled by a suitable thermostatic regulator that at no time is the temperature of the die high enough to effect any burning of the skin of the fruit or to melt any natural coating thereof. The oranges, after being properly washed and cleaned, are polished with paraffine wax which leaves a thin coat of paraffine on the oranges. The fruit is then graded and passes to the belt 12 which, travelling in the direction of the arrow, Figure 2, carries the fruit along either close together or separated as may happen, and then the first orange which arrives against the slight upward incline of the guides 20, or to a point where the faster travelling belt 23 engages its upper surface, is frictionally rolled over the ribbon and the die beneath the ribbon. The ribbon is coated with a coloring material which is fluid at a low degree of heat, and said coloring material unites with the paraffine wax which has been artificially applied to the orange, such uniting being of a pattern according to the design of the die. The first orange to be fed as just described causes the operative run of the friction feeding belt 23 above it to rise, and this movement, combined with the increased speed due to the higher speed of the belt 23, pulls that orange away from the next one in the row, no matter how close said next one may be. Since the approach or travel of the oranges to position is effected only by the lower belt 12, and only the first one to arrive close to the die can be engaged by the upper belt 23, there is no possibility of the fruit becoming clogged in the machine. The rise or lift of the fruit as it is taken up from the carrier belt 12 to the plane of the ribbon which is close to the die, is so slight that the feeder belt 23 will surely carry the fruit along without stopping.

The reason for employing two rolls 37 carried by each arm 39 is to cause the belt 23 to travel in a straight path while rolling an orange over the ribbon and die. And the reason for so arranging the rolls 37 relatively to each other as to give an upward slant to the portion of the belt 23 above the ribbon and die is to cause the belt to begin to descend slowly toward the second orange as the first one is passing over the ribbon and die. Each orange after it has been marked is discharged onto the same belt as that which brought it to the marker. Therefore, when the marking machine is used in connection with a sizer belt as hereinbefore explained, the employment of the marker interferes in no way with the usual functions of the sizer belt. As hereinbefore explained, the marking machine can be adjusted to any position longitudinally of the sizer belt, and consequently all of the oranges can be marked while on their way to escape to the bins of the sizer, or only the larger sizes can be marked. This last result is obtained by so locating the marking machine that the smaller oranges escape from the belt before reaching the marking machine. As is well-known, the sizer of a fruit packing house unit includes a carrier belt from which the fruit rolls laterally through openings of gradually increasing sizes into separate bins, the smaller ones escaping first.

I do not limit myself to the use of the machine for marking fruit which has received an artificial coating of paraffine, so as to unite the color of the ribbon with such paraffine. The machine can be employed to apply the coloring material of the ribbon directly to the skin of the oranges without in any way changing the chemical or physical properties of the orange skin, as by employing a coloring material possessing adhesive qualities so that the said material, when transferred to the orange skin by the pressing action of the die, will adhere to the skin sufficiently for all practical purposes.

Having now described my invention, I claim:—

1. The combination with a carrier belt, of a marking member above the belt, and a friction feeder for rolling articles from the belt over the marking member, said marking member and friction feeder being adjustable longitudinally of the belt.

2. The combination with a carrier belt, of a marking member above the belt, and a friction feeder for rolling articles from the belt over the marking member, said marking member and friction feeder being vertically adjustable relatively to the belt.

3. The combination with the carrier belt of a fruit sizing mechanism, of a stationary fruit marker above the carrier belt, and a feeder belt for rolling the fruit directly from said belt over the marker.

4. The combination with a horizontal carrier, of a friction feeder above the carrier and positioned relatively thereto to contact with fruit successively advanced by said carrier, means being provided for causing the said feeder to travel faster than the carrier to effect separation of the fruit in a row to be marked, and a stationary marking device between the carrier and feeder.

5. The combination with a carrier belt, of a friction belt above it and positioned relatively thereto to contact with fruit successively advanced by said carrier belt, said friction belt having means for yieldingly directing its operative portion in an inclined direction toward the carrier belt, means being provided for causing the said friction belt to travel faster than the carrier belt to effect separation of the fruit in a row to be marked, and a stationary marking device between the said carrier and friction belts.

6. A fruit marking machine having a die, a color-carrying ribbon extending past and close to the die, means for intermittently feeding the ribbon, means for rolling fruit past the ribbon under pressure to pinch the ribbon between the die and the fruit, and means for controlling the feed of the ribbon by the passage of the fruit.

7. A fruit marking machine having a stationary die, a color-carrying ribbon above the die and having means for intermittently feeding it, means for causing fruit to travel over the ribbon and die, and means for controlling the feed of the ribbon by the passage of fruit.

8. A fruit marking machine having a stationary die, a color-carrying ribbon above the die and having means for intermittently feeding it, a guideway for directing fruit toward the die, a trip in line with the guideway, means for rolling fruit from the guideway over the die, and connections between said trip and the ribbon-feeding means to control the latter by the passage of fruit past said trip.

9. The combination with a single wide carrier belt, of a plurality of guides above and close to the belt and having spaces between them to permit fruit to be carried along said spaces by the belt, and stationary marking devices in line with said spaces, and means for rolling fruit from said spaces over the markers.

10. The combination with a single wide carrier belt, of a plurality of guides above and close to the belt and having spaces between them to permit fruit to be carried along said spaces by the belt, stationary markers in line with said spaces, and friction belts for feeding the fruit from said spaces over the markers.

11. The combination with a horizontal carrier, of a guideway in close proximity thereto for directing a row of oranges advanced by said carrier, a feeder belt above the carrier and positioned relatively thereto to engage the tops of oranges successively advanced by the carrier, a marker in line with the guideway between the carrier and feeder belt, and a pair of yieldingly supported rolls in tandem bearing on the operative run of the belt above the marker.

12. The combination with a horizontal carrier, of a guideway in close proximity thereto for directing a row of oranges advanced by said carrier, a feeder belt above the carrier and positioned relatively thereto to engage the tops of oranges successively advanced by the carrier, a marker in line with the guideway between the carrier and feeder belt, and a pivoted arm having a plurality of rolls in tandem bearing on the operative run of the feeder belt above the marker.

13. A marking machine substantially as specified by claim 12, the pivoted arm having a straight flat under surface nearly parallel with the portion of the belt below it.

14. A marking machine substantially as specified by claim 12, the pivoted arm having side guides depending past the edges of the belt.

In testimony whereof I have affixed my signature.

FREDERICK J. SÉVIGNÉ.